Patented Apr. 5, 1927.

1,623,678

UNITED STATES PATENT OFFICE.

RICHARD HERZ AND FRITZ SCHULTE, OF FRANKFORT-ON-THE-MAIN, GERMANY, ASSIGNORS TO GRASSELLI DYESTUFF CORPORATION, OF NEW YORK, N. Y., A CORPORATION OF DELAWARE.

PROCESS FOR PRODUCING 1.8-HYDROXYNAPHTHOIC ACID.

No Drawing. Application filed July 12, 1926, Serial No. 122,029, and in Germany November 29, 1924.

We have found a new process for producing 1.8-hydroxynaphthoic acid, which consists in treating 8-cyannaphthalene-1-sulfonic acid of the formula:

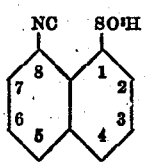

with acid saponifying agents and in subjecting the products thus obtained to the action of caustic alkalies at elevated temperatures.

The chemical reaction, which takes place, runs probably as follows:

(1) 8-cyannaphthalene-1-sulfonic acid is saponified, whereby ammonia is split off and 1-sulfonaphthalene-8-carboxylic acid is formed. If the saponification is carried out with concentrated acids, then instead of the free acid its inner anhydride is obtained. The acid and its inner anhydride are new compounds.

As an intermediate product, 8-naphthamide-1-sulfonic acid can be isolated, a substance, which also can be obtained by allowing an alkaline saponifying agent to react on 8-cyannaphthalene-1-sulfonic acid, as described in our copending application, Serial No. 122,030 filed July 12, 1926.

(2) This 1-sulfonaphthalene-8-carboxylic acid or its inner anhydride produces, if treated with caustic alkalies in aqueous or alcoholic solution at elevated temperatures, in an open or closed vessel, 1.8-hydroxynaphthoic acid in a pure state with an excellent yield.

It is identical in all its properties with the acid, described by Eckstrand (see Journal f. prakt. Chemie (2), vol. 38, page 278).

The following formulas may illustrate the probable course of the reactions:

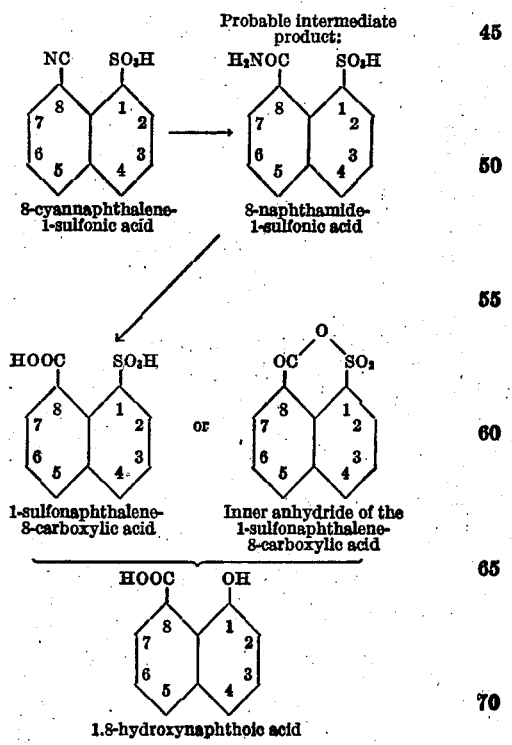

The starting material for the reactions, 8-cyannaphthalene-1-sulfonic acid, is easily obtainable in the usual manner by converting 8-aminonaphthalene-1-sulfonic acid into its diazocompound and treating the latter with cuprous cyanid according to the Sandmeyer reaction. It forms a difficultly soluble sodium salt, which may be isolated from its solutions by adding common salt to it, or by equivalent means. The free 8-cyannaphthalene-1-sulfonic acid may be obtained by converting the sodium salt into the difficultly soluble lead salt and setting the acid free in the usual manner for instance by precipitating the lead with the corresponding amount of sulfuric acid or hydrogen sulfide. 8-cyannaphthalene-1-sulfonic acid is very easily soluble in water and shows a strong acid reaction.

The following examples will further illustrate our new process and the products obtained by it. We wish it however to be understood that we are not limited to the particular conditions nor to the specific products mentioned therein. The parts are by weight and the temperatures in centigrade degrees.

*Example 1.*—10 parts of the sodium salt of 8-cyannaphthalene-1-sulfonic acid are dissolved at ordinary temperature in a five- to sixfold quantity of concentrated sulfuric acid. Then ice is added, until a sulfuric acid of about 60 p. c. strength is formed, and the temperature of the mixture is increased to about 70°. After a short time the whole mass solidifies to a pulp of crystals, namely the inner anhydride of 1-sulfonaphthalene-8-carboxylic acid. It crystallizes from benzene in the form of small tables, melting at 151–152°. When warmed with water, it is easily saponified to 1-sulfonaphthalene-8-carboxylic acid. This acid may be produced directly in the form of its ammonium salt by warming 8-cyannaphthalene-1-sulfonic acid with dilute mineral acids, e. g. dilute hydrochloric acid, until it is totally saponified, and by evaporating the mass to dryness. In order to produce the free acid, one may convert the alkaline salts into the lead salt and set the acid free in the usual manner e. g. by precipitating the lead with the corresponding amount of sulfuric acid or hydrogen sulfide.

*Example 2.*—40 parts of caustic potash are melted with about 8 parts of water. Then 10 parts of the inner anhydride of 1-sulfonaphthalene-8-carboxylic acid, described in the foregoing example, or the corresponding quantity of an alkaline salt of 1-sulfonaphthalene-8-carboxylic acid are introduced and the temperature of the fusion is slowly increased to 190–230° and the mass is kept at this temperature for some time. When the reaction is finished, the fusion mass is diluted and acidified with a mineral acid.

The 1.8-hydroxynapthoic acid thus formed separates in an almost pure state with an excellent yield. It crystallizes from dilute alcohol, as crystals melting at 169° and is identical in all its properties with the acid, described by Eckstrand (loc. cit.).

*Example 3.*—80 parts of caustic potash and 100 parts of methyl alcohol are heated for some time at 80–100°; at this temperature 20 parts of the inner anhydride of 1-sulfonaphthalene-8-carboxylic acid are introduced. Then methyl alcohol is slowly distilled off, until the temperature reaches 130–150°. At this temperature heating is continued for some hours under reflux.

When the reaction is finished, the mass is diluted and acidified with a mineral acid. The 1.8-hydroxynaphthoic acid, thus separated, is identical with the acid, described in example 2.

*Example 4.*—In an autoclave 10 parts of the inner anhydride of 1-sulfonaphthalene-8-carboxylic acid are introduced at about 80° in about 30 parts of caustic soda solution of 50° Bé. Then the mass is heated for 4–6 hours at 230–250°, corresponding to a pressure of 12–15 atmospheres. After cooling down, the formed sodium salt of 1.8-hydroxynaphthoic acid is to a large extent separated in crystalline form.

In order to isolate free 1.8-hydroxynaphthoic acid, the fusion mass is diluted with water and acidified with a mineral acid.

We claim:

1. A new process for producing 1.8-hydroxynaphthoic acid which comprises treating 8-cyannaphthalene-1-sulfonic acid of the formula:

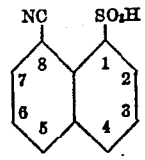

with an acid saponifying agent, treating the product thus obtained with a caustic alkali at an elevated temperature and isolating the formed 1.8-hydroxynaphthoic acid by acidifying the fusion mass.

2. A new process for producing 1.8-hydroxynaphthoic acid which comprises treating 8-cyannaphthalene-1-sulfonic acid of the formula:

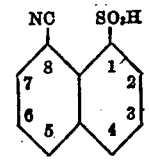

with an acid saponifying agent, and treating the product thus obtained with a caustic alkali at an elevated temperature.

3. A new process for producing 1.8-hydroxynaphthoic acid which comprises treating 8-cyannaphthalene-1-sulfonic acid of the formula:

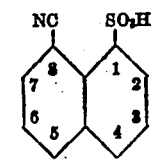

with an acid saponifying agent, and treating the product thus obtained with a caustic alkali at an elevated temperature and under elevated pressure.

4. A new process for producing 1.8-hydroxynaphthoic acid which comprises treating 8-cyannaphthalene-1-sulfonic acid of the formula:

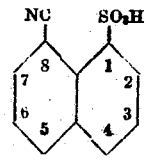

with an acid saponifying agent, and treating the product thus obtained with a caustic alkali in alcoholic solution at an elevated temperature.

5. A new process for producing 1.8-hydroxynaphthoic acid which comprises treating 8-cyannaphthalene-1-sulfonic acid of the formula:

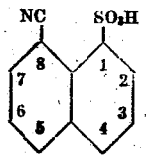

with an acid saponifying agent, and treating the product thus obtained with a caustic alkaline solution at an elevated temperature and under elevated pressure.

6. In the process for producing 1.8-hydroxynaphthoic acid the manufacture of 1-sulfonaphthalene-8-carboxylic acid in the form of its inner anhydride which comprises saponifying 8-cyannaphthalene-1-sulfonic acid with a concentrated mineral acid and isolating it, substantially as described.

7. As a new product the inner anhydride of 1-sulfonaphthalene-8-carboxylic acid, having probably the formula:

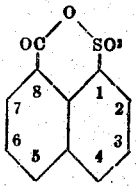

being when dry a crystalline powder, melting at about 151–152° and being substantially identical with the product obtainable by saponifying 8-cyannaphthalene-1-sulfonic acid with a concentrated mineral acid.

In testimony whereof, we affix our signatures.

RICHARD HERZ.
FRITZ SCHULTE.